UNITED STATES PATENT OFFICE.

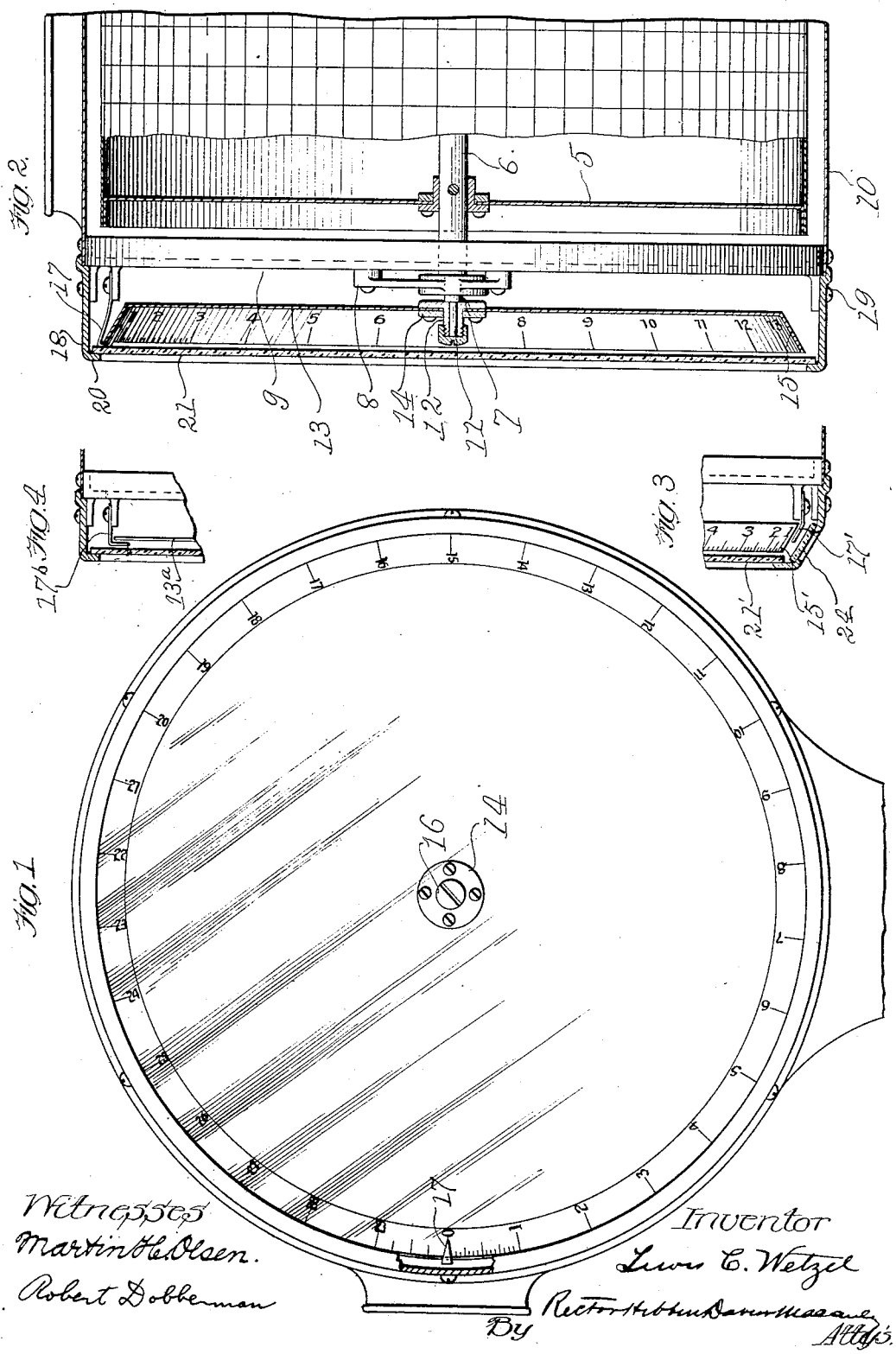

LEWIS CALVIN WETZEL, OF TOLEDO, OHIO, ASSIGNOR, BY MESNE ASSIGNMENTS, TO TOLEDO SCALE COMPANY, OF NEWARK, NEW JERSEY, A CORPORATION OF NEW JERSEY.

WEIGHING-SCALE.

1,234,430.  Specification of Letters Patent.  Patented July 24, 1917.

Application filed September 20, 1912. Serial No. 721,369.

*To all whom it may concern:*

Be it known that I, LEWIS C. WETZEL, a citizen of the United States, residing in the city of Toledo, county of Lucas, and State of Ohio, have invented certain new and useful Improvements in Weighing-Scales, of which the following is a specification.

My invention relates to computing scales, and more particularly to automatic scales and to that type thereof in which the weight and price indications are carried by and shown upon a rotary drum. Ordinarily in scales of this type the drum is suitably connected to the scale beam and inclosed in a casing of corresponding shape in which it is journaled, and which has a longitudinal opening provided on one side for observation by the salesman of the weight and value indications extending substantially the length of the drum. It is also common to provide upon the diametrically opposite side of the casing a comparatively small sight opening for the use of the customer or purchaser to enable him to observe the weight of the article upon the scale pan, the drum being provided with a registering annular series of weight numerals for this purpose. In order, however, for the customer or purchaser to observe the weight it is necessary for him to stand substantially opposite the opening, in which case the drum housing is directly between him and the salesman, which is inconvenient and annoying where conversation is to be carried on between the two, and ordinarily the customer will stand to one side in order to talk to the salesman and thereby fail to observe the weight of the article which he is purchasing. It is the object of this invention to provide a customer's indication or indications in such a position upon the scale housing that it may be readily observed by the customer without interfering in any way with his view of the salesman, though the latter may occupy the position most convenient for manipulating the scale and observing the chart indications. With this end in view I provide a weight indicator which is observable by the purchaser from a wide range of positions, the indicator in question being mounted upon the end of the shaft of the computation indicating chart. In the accompanying drawings I have indicated a number of forms which my invention may take for the purpose of illustrating the same. It will be understood, however, that my invention is not limited to either or all of these specific forms, but its scope is indicated by the following claims.

Referring to the drawings: Figure 1 is an end elevation of the casing of a rotary cylinder chart embodying my invention in one of its specific forms; Fig. 2 is a fragmentary horizontal section of an end of the same; Fig. 3 is a sectional horizontal detail of a modified construction; and Fig. 4 is a similar view of still a different specific form. In the following detailed description and in the drawings each part is referred to by the same reference numerals throughout.

In the accompanying drawings I have not thought it necessary to illustrate the weighing mechanism proper which may be of any well-known or approved type, such as the ordinary counter platform scale comprising a beam, scale pan and automatic counterbalancing means, whether of the pendulum or spring type. The drum or chart 5 (Fig. 2) is mounted as usual upon a shaft 6 to which it is rigidly secured and which is revolved from the beam of the scale in any usual manner. The shaft 6 is journaled in bearings 7 formed in brackets 8 secured to the frame 9 of the casing 10, and projects beyond the bearing where it is reduced as at 11 to receive a flanged collar 12 which carries the end indicator. The latter is in the form of a disk 13 clamped between the flange of the collar 12 and the annulus 14, and, in the modification shown in Figs. 1 and 2, dished or provided with a flaring flange 15 around the interior of which is arranged an annular series of weight indications, as clearly shown in the drawing. I have shown the sleeve 12 as secured in place by being split, the resulting sections being forced together about the reduced shaft $n$ by a screw cap 16. With this form of disk with the outwardly flaring flange I employ a pointer 17, which is fixedly mounted upon the frame-work and bent around the edge of the flaring rim or flange to a position immediately over the series of indications. The pointer is located on that side of the casing adjacent the salesman's sight opening, so that it may be read from any position within a wide angle approaching on the one side the perpendicular to the axis of the cylinder and including on the other side the axial line of the cylinder. In this construction, therefore, the position of the purchaser in reading the scale is not confined to narrow limits, but he may stand substantially anywhere within convenient talking range of the salesman.

In the modification shown in Fig. 3 the dishing or flare of the rim 15' is reversed and the weight indications placed upon the outside thereof. In this form of my invention the pointer 17' is fixed in a position remote from the salesman's sight opening, where it would in ordinary use be toward the purchaser or customer. The range within which this scale is visible to the customer is substantially the same as that in the previously described form of the invention.

In the form of the invention shown in Fig. 4 the disk is flat and has no rim or flange, the series of numerals being arranged around the edge of the disk 13ª, and the pointer 17ᵇ, in this instance, is bent over the edge of the disk. While this form of the device is fairly satisfactory I prefer the previously described forms in which the weight indications are arranged upon the inclined flanges, as the weight may be read more readily thereon from positions in which the customer is more likely to stand.

The casing is inclosed at the end at which the disk indicator is located by an end cap provided with glass to enable the customer to observe the reading of the weight indications. With the form of indicators shown in Figs. 2 and 4 the end cap takes the form of a cylindrical annulus 18 having an inwardly turned lip or flange 20 attached as at 19 to the drum casing, the circular opening within the flange being closed by a glass plate 21. A similar construction of course might be employed with the form of indicator shown in Fig. 3. I prefer, however, and have illustrated in connection with this form of indicator an end cap which is partly conical corresponding to the flare of the indicator with a window 24 over and in register with the stationary finger or pointer 17' through which the numerals on the indicator chart may be read. The circular opening in the end of the cap may be closed as before by a flat pane 21'. Obviously, if desired, end indicators might be placed upon both ends of the drum indicator, but for most purposes and in most locations in which scales are used a single end indicator is sufficient.

By this improved construction the necessary length of the drum chart, as compared with the construction heretofore employed, is lessened, since the annular series of customers' indications is omitted therefrom and the convenience of a purchaser or customer in verifying the weight of his purchase is materially augmented, as pointed out above.

I claim—

1. In an indicator for weighing scales, a rotary drum, a disk mounted at the end thereof for revolution therewith having an inclined flange, a series of weight numerals arranged around the flange, and a stationary pointer coöperating with the series of weight numerals to indicate the weight of the commodity upon the scale pan.

2. In an indicator for weighing scales a rotary drum, an indicator disk mounted at the end thereof for revolution therewith, an outwardly flaring flange upon said disk, a series of weight numerals upon the interior of the flange and a stationary pointer coöperating with said series of weight numerals for indicating the weight of the commodity upon the scale.

3. In an indicator for weighing scales a casing a rotary drum, a shaft whereon the drum is mounted journaled in the casing and projecting at one end beyond its bearing, an indicator disk mounted upon the projecting end of the shaft and carrying an annular series of weight indications, and a stationary pointer coöperating therewith.

4. In a weighing scale, indicating mechanism comprising a rotatable shaft actuated from the weighing mechanism of the scale, a graduated disk secured to said shaft at one end thereof and having an inclined flange, and a stationary pointer arranged to coöperate with the graduations upon said disk.

5. In a weighing scale, indicating mechanism comprising a rotatable shaft actuated from the weighing mechanism of the scale, a disk secured to said shaft at one end thereof, said disk having an outwardly flaring flange, a series of graduations upon the interior of said flange, and a stationary pointer arranged to coöperate with the graduations upon said flange.

LEWIS CALVIN WETZEL.

Witnesses:
　EDWARD FRANK ULRICH,
　CLARENCE W. FESSENDEN.

Copies of this patent may be obtained for five cents each, by addressing the "Commissioner of Patents, Washington, D. C."